United States Patent
Bacher et al.

(10) Patent No.: US 9,244,710 B2
(45) Date of Patent: Jan. 26, 2016

(54) CONCURRENT HYPERVISOR REPLACEMENT

(71) Applicant: INTERNATIONAL BUSINESS MACHINES CORPORATION, Armonk, NY (US)

(72) Inventors: Utz Bacher, Boeblingen (DE); Einar Lueck, Boeblingen (DE); Angel Nunez Mencias, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 13/874,066

(22) Filed: Apr. 30, 2013

(65) Prior Publication Data

US 2014/0101657 A1 Apr. 10, 2014

(30) Foreign Application Priority Data

Oct. 8, 2012 (GB) .................................. 1217986.7

(51) Int. Cl.
*G06F 9/455* (2006.01)
(52) U.S. Cl.
CPC ........ *G06F 9/45533* (2013.01); *G06F 9/45558* (2013.01); *G06F 2009/45583* (2013.01)
(58) Field of Classification Search
None
See application file for complete search history.

(56) References Cited

U.S. PATENT DOCUMENTS

| | | | |
|---|---|---|---|
| 7,814,495 B1 * | 10/2010 | Lim et al. | 718/104 |
| 2010/0318608 A1 | 12/2010 | Huang | |
| 2011/0023030 A1 | 1/2011 | Lim et al. | |
| 2011/0258701 A1 * | 10/2011 | Cruz et al. | 726/23 |
| 2012/0017031 A1 | 1/2012 | Mashtizadeh et al. | |
| 2012/0102258 A1 | 4/2012 | Hepkin et al. | |
| 2012/0117562 A1 | 5/2012 | Jess et al. | |
| 2012/0192182 A1 | 7/2012 | Hayward et al. | |
| 2012/0254865 A1 * | 10/2012 | Saeki et al. | 718/1 |

FOREIGN PATENT DOCUMENTS

| | | |
|---|---|---|
| EP | 1962192 A1 | 8/2008 |
| EP | 2315119 A1 | 4/2011 |

OTHER PUBLICATIONS

Combined Search and Examination Report for GB1319575.5 dated Apr. 9, 2014, pp. 1-5.
IBM, "Instantaneous Virtual Machine Live Migration on a Partitioned Scaled System," IPCOM000184453D, Jun. 2009, p. 1.
(Continued)

*Primary Examiner* — Kenneth Tang
(74) *Attorney, Agent, or Firm* — Steven Chiu, Esq.; Blanche E. Schiller, Esq.; Heslin Rothenberg Farley & Mesiti P.C.

(57) ABSTRACT

Replacing a source hypervisor by a target hypervisor in a system having a first level hypervisor managing multiple logical partitions to share a set of resources of a server. The source hypervisor enabling at least one source virtual machine to share resources that are assigned to a source logical partition of the multiple logical partitions where the source hypervisor runs, the target hypervisor enabling at least one target virtual machine to share resources that are assigned to a target logical partition of the multiple logical partitions where the target hypervisor runs, wherein memory segments of a physical memory of the server are assigned to the at least one source virtual machine.

20 Claims, 2 Drawing Sheets

(56) References Cited

OTHER PUBLICATIONS

IBM, "Method for Providing a Fast Dump and Restart Algorithm for an Operating System Running in a Logical Partition," IPCOM000186081D, Jun. 2009, pp. 1-2.

Bacher, Utz, et al., "Workload Migration Between Virtualization Softwares," U.S. Appl. No. 14/090,014, filed Nov. 26, 2013, pp. 1-35.

Office Action for U.S. Appl. No. 14/702,179 dated Sep. 14, 2015, pp. 1-17.

* cited by examiner

CONCURRENT HYPERVISOR REPLACEMENT

PRIOR FOREIGN APPLICATION

This application claims priority from United Kingdom patent application number 1217986.7, filed Oct. 8, 2012, which is hereby incorporated herein by reference in its entirety.

BACKGROUND

One or more aspects of the invention relate to virtual environment systems, and more particularly to hypervisor replacement.

Computer virtualization becomes one of the more important technologies for different sized companies. It increases the computational efficiency and flexibility of a computing hardware platform.

Hypervisors play an increasingly critical role in IT infrastructures. Availability is a critical requirement for a virtualized environment. One of the challenges to overcome is hypervisor maintenance.

BRIEF SUMMARY

One or more aspects provide an improved computer-implemented method for hypervisor replacement in a computing environment, computer system and a computer program product.

Shortcomings of the prior art are overcome and additional advantages are provided through the provision of a method of replacing a source hypervisor by a target hypervisor in a system comprising a first level hypervisor managing multiple logical partitions to share a set of resources of a server, the source hypervisor enabling at least one source virtual machine to share resources that are assigned to a source logical partition of the multiple logical partitions where the source hypervisor runs, the target hypervisor enabling at least one target virtual machine to share resources that are assigned to a target logical partition of the multiple logical partitions where the target hypervisor runs, wherein memory segments of a physical memory of the server are assigned to the at least one source virtual machine, wherein the first level hypervisor maintains a mapping table of pointers to the memory segments. The method including, for instance, suspending execution of guest instructions in the at least one source virtual machine; marking the memory segments with a logical value indicating that the memory segments are unused; storing content of the memory segments in a source temporary memory of the source hypervisor, wherein the source temporary memory comprises a memory that is allocated for use as a virtual disk partition; selecting the target hypervisor; reassigning the memory segments to the target hypervisor while keeping the memory content intact; assigning the content of the source temporary memory to a target temporary memory of the target hypervisor, wherein the target temporary memory comprises a memory that is allocated for use as a virtual disk partition; and resuming the execution of the guest instructions in the at least one target virtual machine of the target hypervisor from the target temporary memory, based on the reassignment being successful.

BRIEF DESCRIPTION OF THE SEVERAL VIEWS OF THE DRAWINGS

In the following, embodiments of the invention will be described in detail by way of example only making reference to the drawings in which.

DETAILED DESCRIPTION

In the following, like numbered elements in the figures either designate similar elements or designate elements that perform an equivalent function. Elements which have been discussed previously will not necessarily be discussed in later figures if the function is equivalent.

Figure 1:
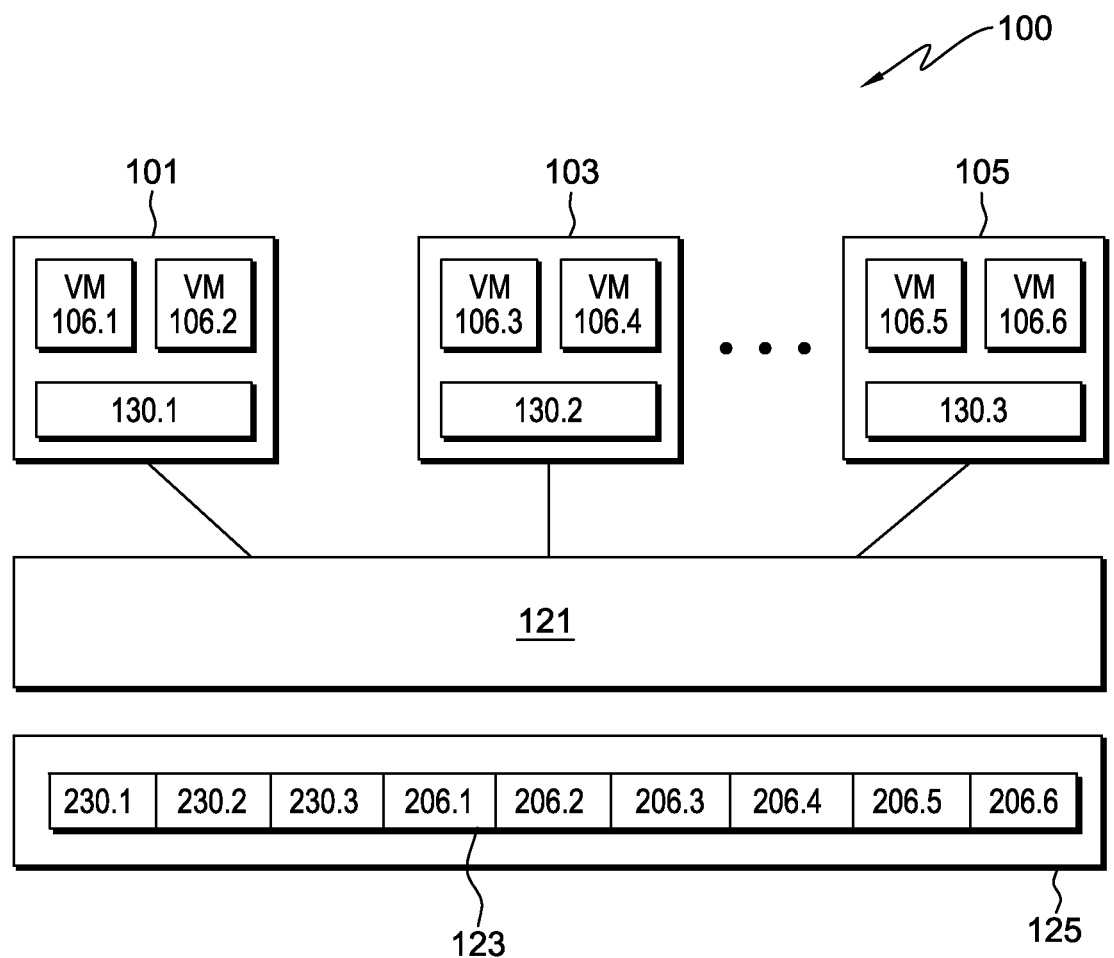
FIG. 1 illustrates system architecture for the execution of a method for hypervisor replacement.

FIG. 1 depicts a system architecture 100 operable to execute a process for replacing a source hypervisor by a target hypervisor. The system 100 provides a first level hypervisor 121. The first level hypervisor 121 may enable multiple logical partitions e.g. 101, 103 and 105 to share resources of a physical server 125. For that, the first level hypervisor 121 may transform physical resources of the physical server 125 into virtual resources so that the logical partitions can share the same physical resources. For example, the first level hypervisor 121 may enable each logical partition to have dedicated or shared processors and I/O, and dedicated memory. The first level hypervisor 121 may also enable to dynamically add and delete resources like processors, I/O, and memory across logical partitions while the partitions are actively in use.

Each of logical partitions 101, 103 and 105 may operate like an independent system running its own operating environment.

Each of logical partitions 101, 103 and 105 may run a second level hypervisor 130.1, 130.2 and 130.3. Each of the second level hypervisors 130 may create multiple virtual machines within its logical partition, for example, virtual machines 106.1 and 106.2 on logical partition 101, and virtual machines 106.5 and 106.6 on logical partition 105. Each virtual machine is running an operating environment or system and applications independent of the other virtual machines, while sharing the same physical resources. For that, each of the second level hypervisors 130 may emulate the existence of physical resources (e.g. storage, and I/O) to each virtual machine by treating the availability of such resources as a shared resource pool.

Each of the virtual machines 106 may use a virtual machine memory to store its operating system and program files. One or more applications run on the operating system. Each virtual machine memory address is mapped to a physical memory address of a memory portion 206 of the memory 123. For example, memory segments of portion 206.1 may be allocated to virtual machine 106.1. The memory 123 further comprises a RAMdisk portion 230 that is allocated for use as a virtual disk partition by each one of the second level hypervisor 130. For example, the RAMdisk portion 230.3 may be allocated to the second level hypervisor 130.3.

The first level hypervisor 121 maintains a mapping table of pointers to the memory segments The logical partitions 101, 103 and 105 may be grouped into the same subnet, managed by a single machine or on multiple subnets managed by different machines.

The system architecture 100 may be part of a zEnterprise system of IBM®. The first level hypervisor may be Processor Resource/System Manager (PR/SM™) with all IBM® System z™. The second level hypervisor may be a KVM (Kernel-based Virtual Machine) hypervisor. The second level hypervisor may support Linux®, z/OS®, z/OS.e, Transaction Processing Facility (TPF), and z/VSE™ as a guest operating system. The Ramdisk may be a tmpfs (temporary file storage) memory.

The operation of the system 100 will be described in more detail with reference to FIG. 2.

Figure 2:
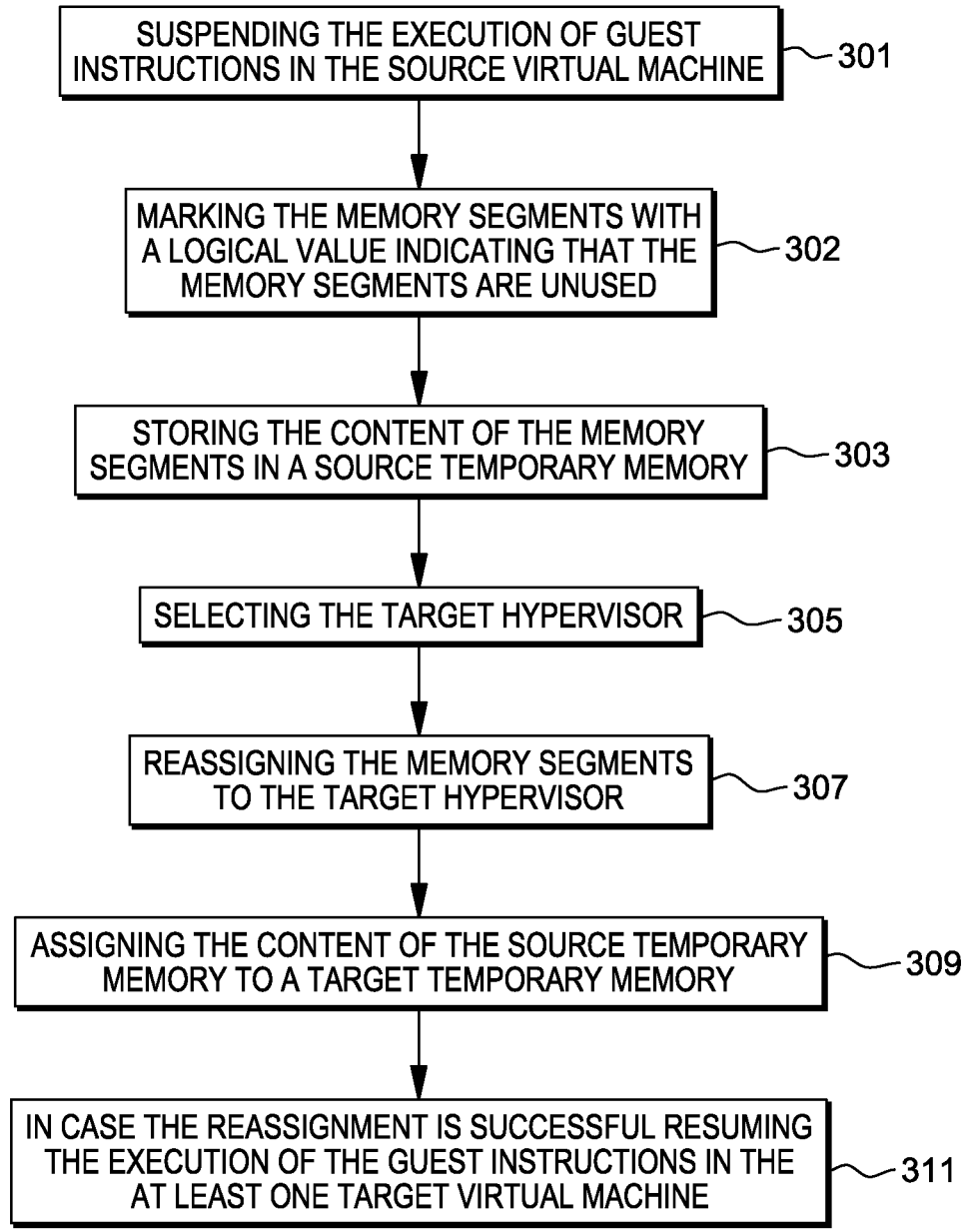
FIG. 2 is a flowchart of a method for hypervisor replacement.

FIG. 2 is a flowchart of a method for replacing a source hypervisor e.g. 130.1 by a target hypervisor e.g. 130.3.

In step 301, a controller of the system 100 may control the source hypervisor 130.1 to suspend the execution of guest instructions in a source virtual machine e.g. 106.1. This is may be performed by a Quick EMUlator (QEMU) of the source hypervisor. In step 302, the QEMU may mark the memory segments with a logical value indicating that said memory segments are unused. For that, QEMU may use MADV_REMOVE calls. The suspending is performed in response to a security issue or a faulty memory management detected in the source hypervisor 130.1.

The controller may be part of zManager (i.e. HMC of a zEnterprise). Alternatively, the controller may be part of the first level hypervisor 121.

In step 303, the controller may control the source hypervisor 130.1 to store the content of the memory segments 206.1 in a source temporary memory 230.1 of the source hypervisor 130.1. The source temporary memory 230.1 may be allocated for use as a virtual disk partition. After storing the content, the source temporary memory 230.1 may be frozen. Alternatively, after the storing, the source hypervisor 130.1 may require the virtual machine 106.1 to explicitly request any operation such as a write operation to be performed on the content of the source temporary memory 230.1. The source hypervisor may thus decide to allow the request or not depending on how much the overall memory may be affected.

In step 305, the controller selects the target hypervisor 130.3. The target hypervisor is a newly updated hypervisor which does not have any known security nor faulty memory management problems. The target hypervisor is selected from the remaining hypervisors of the multiple hypervisors which are managed by the first level hypervisor 121.

In step 307, the controller may control the first level hypervisor 121 to reassign the memory segments to the target hypervisor 130.3 while keeping the memory content intact. Further, the controller may update the mapping table to associate the memory segments 206.1 to the target hypervisor 130.3.

In step 309, the controller may control the first level hypervisor 121 to assign the content of the source temporary memory 230.1 to a target temporary memory 230.3 of the target hypervisor 130.3.

This may be done, for example, by an unplug memory operation with source tmpfs data (content of the source temporary memory 230.1) and adding the content via a memory hotplug operation in the target hypervisor.

In step 311, in case the reassignment is successful, the controller may control the target hypervisor 130.3 to resume the execution of the guest instructions in a target virtual machine e.g. 106.5 of the target hypervisor 130.3 from the target temporary memory 230.3. For that, the content of the memory segments stored in the target temporary memory 230.3 is read. As soon as the content of a memory segment is read it is removed from the target temporary memory 230.3. After reading the full content of all memory segments, the execution of the guest instructions is resumed in the target virtual machine 106.5.

The content of the source temporary memory 230.1 may thus be removed.

In case the reassignment is unsuccessful, the source virtual machine 106.1 is resumed from the source temporary memory 230.1 and the memory segments 206.1 are reassigned to the source hypervisor 1. Also for this case, the content of the memory segments stored in the source temporary memory 230.1 is read. As soon as the content of a memory segment is read it is removed from the source temporary memory 230.1. After reading the full content of all memory segments, the execution of the guest instructions is resumed in the source virtual machine 106.1.

The full migration of the source hypervisor to the target hypervisor is achieved by executing the same method steps described above including steps 301-311, for each virtual machine of the remaining virtual machines of the source hypervisor 230.1. For example, a second source virtual machine 106.2 may be migrated to a second target virtual machine 106.6.

One aspect relates to a computer implemented method for replacing a source hypervisor by a target hypervisor in a system comprising a first level hypervisor managing multiple logical partitions to share a set of resources of a server. The logical partition may comprise one or more virtualized machines that can include shared and dedicated resources assigned from the pool of resources available on the server.

The source hypervisor enables at least one source virtual machine to share resources that are assigned to a source logical partition of the multiple logical partitions. The target hypervisor enables at least one target virtual machine to share resources that are assigned to a target logical partition of the multiple logical partitions. The first level hypervisor may provide a first level of virtualization. The source and target hypervisors may provide a second level of virtualization. In another example, the source and target hypervisor may provide the same level of virtualization as the first level hypervisor. That is, both hypervisors may be part of the first level hypervisor.

The expression "at least one" means one or more and thus includes individual components as well as mixtures/combinations.

Memory segments of a physical memory of the server are assigned to the at least one source virtual machine, wherein the first level hypervisor maintains a mapping table of pointers to the memory segments. The memory segments refer to blocks, portions or sections of the physical memory of the server. Those blocks may be of the same size (i.e., same amount of memory content) and/or different size. They may be contiguous and/or non-contiguous blocks. A pointer may point to a physical memory address of a memory segment being used at user-level applications to access data in a memory location identified by the physical memory address.

One aspect includes suspending the execution of guest instructions in the at least one source virtual machine. The suspending including terminating input/output operations between the at least one source virtual machine and the source hypervisor (or physical server).

A further aspect includes marking the memory segments with a logical value indicating that the memory segments are unused. This may free up portions of memory that are suspended already, and may lead to unchanged (i.e. no additional free memory may be required) usage of memory in that memory consumption decreases just as the source temporary memory usage increases.

One aspect includes storing the content of the memory segments in a source temporary memory of the source hypervisor. The content of the memory segments includes, for instance, a state of the at least one source virtual machine at a time of the suspending, including physical resource states associated with the at least one virtual machine and applications status. The source temporary memory may be part of the memory partition assigned to the source hypervisor. The source temporary memory and the target temporary memory may be a portion of memory that is allocated for use as a virtual disk partition.

One aspect includes selecting the target hypervisor. The hypervisor may be selected from the multiple hypervisors.

Further, an aspect includes reassigning the memory segments to the target hypervisor. For example, the memory segments that were assigned to and used by the source hypervisor are assigned for usage by the target hypervisor. The reassigning of the memory segments may include reassigning the same memory amount occupied by the content of the memory segments either using the same physical addresses of the memory segments or using other free memory segments having different physical addresses than the physical addresses of the memory segments that were assigned to the source hypervisor. In one aspect, the content of the source temporary memory is assigned to a target temporary memory of the target hypervisor, and execution of the guest instructions are resumed in the at least one target virtual machine of the target hypervisor from the target temporary memory, in case the reassignment is successful.

In one or more aspects, the memory consumption remains constant during the replacement (or migration) of the source hypervisor to the target hypervisor. It does not require additional memory to be present in the source and target hypervisor during the time of the migration. This may allow a quasi-live-migration to the target hypervisor running in a neighbor partition without requiring additional memory in the target hypervisor. Thus, the usage of disk paging through minimizing the resident memory footprint that would be otherwise required in case the memory is not available in the target hypervisor may be avoided. This is helpful in large server environments, such as enterprise server environments, e.g. System z, because such migration may require (without applying one or more aspects of the present subject matter) additional hundreds of Gigabytes, which may then significantly increase the cost.

Additionally, in one or more aspects, the suspending is performed to a temporary memory which is allocated for use as a virtual disk partition and not directly suspending to the target hypervisor e.g. to a memory such as a RAM. The data structure in the temporary memory may be compatible between the source hypervisor and the target hypervisor, in contrast to another memory or storage which may have inconsistent data structure in the source and target hypervisors.

One embodiment is hereby described for one virtual machine in the source logical partition but as those skilled in the art will easily understand it may be generalized to a plurality and variety of virtual machines within the same logical partition. For example, in case the at least one virtual machine comprises two virtual machines, the method steps may be repeated twice; one time for each one of the virtual machines.

In one embodiment, one aspect further comprises after resuming shutting down the source hypervisor.

According to one embodiment, the suspending is performed in response to a fault condition detected in the source hypervisor, wherein the selected hypervisor is dissatisfying the fault condition, the fault condition comprising performance degradation of one or more features of the source hypervisor.

This may protect the system from, for example, malicious attack, by masking/replacing the system parts which are susceptible to intrusion and malicious attack footprints. Thus, providing security from intrusion and malicious attack may be important for protection and successful operation of the whole system. This may also ensure a non-interrupted service of the system.

According to one embodiment, the selected hypervisor is an updated hypervisor. That is, at the time of suspending the at least one source virtual machine, the target hypervisor is already in an updated state in such a way that it dissatisfies the fault condition.

According to one embodiment, the one or more features comprise at least one of a security and a memory management. For example, the source hypervisor may have technical problems that may require replacement of that hypervisor with a target hypervisor being updated and thus having no technical issues.

According to one embodiment, the storing further comprises: freezing the stored content in the source temporary memory. The source temporary memory may not accept any further read or write requests. The only accepted request may be a destroy and/or unfreeze request. This may avoid any addition of content into the source temporary memory that would require additional memory to be allocated in the target hypervisor when assigning the content of the source temporary memory to the target temporary memory. This is because, the amount of memory of the segments of the at least one source virtual machine may not be sufficient (when reassigned to the target hypervisor) to cover the additional content of the source temporary memory. Thus, this may keep the overall memory consumption constant.

According to one embodiment, the source hypervisor may require the at least one virtual machine to explicitly request any operation (e.g. a write operation) to be performed on the content of the source temporary memory. The source hypervisor may thus decide to allow the request or not depending on how much the overall memory may be affected. For example, if the request indicates to remove a part of the content of the source temporary memory content which is unnecessary to run the applications of the at least one virtual machine, the source hypervisor may accept the request as no additional memory would be required when migrating to the target hypervisor.

According to one embodiment, the reassigning includes updating the mapping table to associate the memory segments to the target hypervisor. Thus, the target hypervisor may have access rights to the memory segments.

According to one embodiment, after resuming the execution of the guest instructions, the content from the source temporary memory is removed. This may free up memory from unnecessary content.

According to one embodiment, the resuming includes reading the content of the memory segments stored in the target temporary memory; removing the content of each memory segment from the target temporary memory after reading the content of the memory segment; and resuming the execution of the guest instructions in the at least one target virtual machine. This may prevent any memory addition during and/or after movement of the content of the target temporary memory. After the reading, the content of the target temporary memory may belong to the memory assigned to the at least one target virtual machine.

According to one embodiment, in case the reassignment is unsuccessful the at least one virtual machine is resumed from the source temporary memory, and the memory segments are reassigned to the source hypervisor.

This embodiment may ensure a non-interrupted service to the system guests since the applications may still run on the at least one virtual machine.

According to one embodiment, in case the reassignment is unsuccessful and the source temporary memory is frozen, unfreezing the content of the source temporary memory before resuming the at least one virtual machine from the source temporary memory.

According to one embodiment, the first level hypervisor includes a PR/SM hypervisor, wherein each one of the source and target hypervisor comprises a KVM hypervisor, wherein each of the source and target temporary memory comprises a Random-Access Memory, RAM. According to one embodiment, the RAM comprises a tmpfs memory.

One or more aspects of the present subject matter may be applied to an IBM zEnterprise system.

One or more aspects relate to a computer-readable medium, comprising computer-readable program code embodied therewith which, when executed by a processor, cause the processor to execute a method according to any of the claims.

One or more aspects relate to a computer system including a first level hypervisor providing multiple logical partitions to share a set of resources of a server, the source hypervisor being adapted to enable at least one source virtual machine to share resources that are assigned to a source logical partition of the multiple logical partitions where the source hypervisor runs, the target hypervisor being adapted to enable at least one target virtual machine to share resources that are assigned to a target logical partition of the multiple logical partitions where the target hypervisor runs, wherein memory segments of a physical memory of the server are assigned to the at least one source virtual machine, wherein the first level hypervisor maintains a mapping table of pointers to memory segments, the computer system further including a controller being adapted to:
control the source hypervisor to suspend the execution of guest instructions in the at least one source virtual machine;
control the source hypervisor to mark the memory segments with a logical value indicating that the memory segments are unused;
control the source hypervisor to store the content of the memory segments in a source temporary memory of the source hypervisor, wherein the source temporary memory includes a memory that is allocated for use as a virtual disk partition;
select the target hypervisor;
control the first level hypervisor to reassign the memory segments to the target hypervisor while keeping the source temporary memory content intact;
control the first level hypervisor to assign the content of the source temporary memory to a target temporary memory of the target hypervisor, wherein the target temporary memory comprises a memory that is allocated for use as a virtual disk partition; and
control the target hypervisor to resume the execution of the guest instructions in the at least one target virtual machine of the target hypervisor from the target temporary memory, in case the migration is successful.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The term "virtual machine" as used herein refers to software implementation of a computer that executes programs like a physical computer.

The term "hypervisor" or virtual machine monitor as used herein refers to the software layer providing virtualization and supports multiple virtual machines.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

What is claimed is:

1. A computer implemented method of replacing a source hypervisor by a target hypervisor in a system comprising a first level hypervisor managing multiple logical partitions to share a set of resources of a server, the source hypervisor enabling at least one source virtual machine to share resources that are assigned to a source logical partition of the multiple logical partitions where the source hypervisor runs, the target hypervisor enabling at least one target virtual machine to share resources that are assigned to a target logical partition of the multiple logical partitions where the target hypervisor runs, wherein memory segments of a physical memory of the server are assigned to the at least one source virtual machine, wherein the first level hypervisor maintains a mapping table of pointers to the memory segments, the method comprising:

suspending execution of guest instructions in the at least one source virtual machine;
   marking the memory segments assigned to the at least one source virtual machine with a logical value indicating that the memory segments are unused;
   storing content of the memory segments in a source temporary memory of the source hypervisor, wherein the source temporary memory comprises a memory that is allocated for use as a virtual disk partition;
   selecting the target hypervisor to which the at least one source virtual machine is to be migrated, wherein the source hypervisor and the target hypervisor are coupled to the first level hypervisor and are configured to concurrently execute virtual machines;
   reassigning the memory segments to the target hypervisor while keeping the memory content intact;
   assigning the content of the source temporary memory to a target temporary memory of the target hypervisor, wherein the target temporary memory comprises a memory that is allocated for use as a virtual disk partition; and
   resuming the execution of the guest instructions in the at least one target virtual machine of the target hypervisor from the target temporary memory, based on the reassignment being successful.

2. The method of claim 1, wherein the suspending is performed based on a fault condition detected in the source hypervisor, the fault condition comprising performance degradation of one or more features of the source hypervisor.

3. The method of claim 2, wherein the one or more features comprise at least one of a security and a memory management.

4. The method of claim 1, wherein the storing further comprises freezing the stored content in the source temporary memory.

5. The method of claim 1, wherein the reassignment comprises updating the mapping table to associate the memory segments to the target hypervisor.

6. The method of claim 1, further comprising:
   based on resuming the execution of the guest instructions, removing the content from the source temporary memory.

7. The method of claim 1, wherein the resuming comprises:
   reading the content of the memory segments stored in the target temporary memory;
   removing the content of each memory segment from the target temporary memory, based on reading the content of said memory segment; and
   resuming the execution of the guest instructions in the at least one target virtual machine.

8. The method of claim 1, further comprising:
   based on the reassignment being unsuccessful, resuming the at least one source virtual machine from the source temporary memory, and reassigning the memory segments to the source hypervisor.

9. The method of claim 1, wherein the first level hypervisor comprises a Processor Resource/System Manager hypervisor, wherein each one of the source and target hypervisors comprises a Kernel-based Virtual Machine hypervisor, wherein each of the source and target temporary memory comprises a Random-Access Memory.

10. The method of claim 9, wherein the Random-Access Memory comprises a temporary file storage memory.

11. A computer program product for replacing a source hypervisor by a target hypervisor in a system comprising a first level hypervisor managing multiple logical partitions to share a set of resources of a server, the source hypervisor enabling at least one source virtual machine to share resources that are assigned to a source logical partition of the multiple logical partitions where the source hypervisor runs, the target hypervisor enabling at least one target virtual machine to share resources that are assigned to a target logical partition of the multiple logical partitions where the target hypervisor runs, wherein memory segments of a physical memory of the server are assigned to the at least one source virtual machine, wherein the first level hypervisor maintains a mapping table of pointers to the memory segments, the computer program product comprising:
  a computer readable storage medium readable by a processing circuit and storing instructions for execution by the processing circuit for performing a method comprising:
    suspending execution of guest instructions in the at least one source virtual machine;
    marking the memory segments assigned to the at least one source virtual machine with a logical value indicating that the memory segments are unused;
    storing content of the memory segments in a source temporary memory of the source hypervisor, wherein the source temporary memory comprises a memory that is allocated for use as a virtual disk partition;
    selecting the target hypervisor to which the at least one source virtual machine is to be migrated, wherein the source hypervisor and the target hypervisor are coupled to the first level hypervisor and are configured to concurrently execute virtual machines;
    reassigning the memory segments to the target hypervisor while keeping the memory content intact;
    assigning the content of the source temporary memory to a target temporary memory of the target hypervisor, wherein the target temporary memory comprises a memory that is allocated for use as a virtual disk partition; and
    resuming the execution of the guest instructions in the at least one target virtual machine of the target hypervisor from the target temporary memory, based on the reassignment being successful.

12. The computer program product of claim 11, wherein the suspending is performed based on a fault condition detected in the source hypervisor, the fault condition comprising performance degradation of one or more features of the source hypervisor.

13. The computer program product of claim 11, wherein the method further comprises:
  based on resuming the execution of the guest instructions, removing the content from the source temporary memory.

14. The computer program product of claim 11, wherein the resuming comprises:
    reading the content of the memory segments stored in the target temporary memory;
    removing the content of each memory segment from the target temporary memory, based on reading the content of said memory segment; and
    resuming the execution of the guest instructions in the at least one target virtual machine.

15. The computer program product of claim 11, wherein the method further comprises:
  based on the reassignment being unsuccessful, resuming the at least one source virtual machine from the source temporary memory, and reassigning the memory segments to the source hypervisor.

16. A computer system for replacing a source hypervisor by a target hypervisor in a system comprising a first level hypervisor managing multiple logical partitions to share a set of resources of a server, the source hypervisor enabling at least one source virtual machine to share resources that are assigned to a source logical partition of the multiple logical partitions where the source hypervisor runs, the target hypervisor enabling at least one target virtual machine to share resources that are assigned to a target logical partition of the multiple logical partitions where the target hypervisor runs, wherein memory segments of a physical memory of the server are assigned to the at least one source virtual machine, wherein the first level hypervisor maintains a mapping table of pointers to the memory segments, the computer system configured to perform a method, said method comprising:
    suspending execution of guest instructions in the at least one source virtual machine;
    marking the memory segments assigned to the at least one source virtual machine with a logical value indicating that the memory segments are unused;
    storing content of the memory segments in a source temporary memory of the source hypervisor, wherein the source temporary memory comprises a memory that is allocated for use as a virtual disk partition;
    selecting the target hypervisor to which the at least one source virtual machine is to be migrated, wherein the source hypervisor and the target hypervisor are coupled to the first level hypervisor and configured to concurrently execute virtual machines;
    reassigning the memory segments to the target hypervisor while keeping the memory content intact;
    assigning the content of the source temporary memory to a target temporary memory of the target hypervisor, wherein the target temporary memory comprises a memory that is allocated for use as a virtual disk partition; and
    resuming the execution of the guest instructions in the at least one target virtual machine of the target hypervisor from the target temporary memory, based on the reassignment being successful.

17. The computer system of claim 16, wherein the suspending is performed based on a fault condition detected in the source hypervisor, the fault condition comprising performance degradation of one or more features of the source hypervisor.

18. The computer system of claim 16, wherein the method further comprises:
    based on resuming the execution of the guest instructions, removing the content from the source temporary memory.

19. The computer system of claim 16, wherein the resuming comprises:
    reading the content of the memory segments stored in the target temporary memory;

removing the content of each memory segment from the target temporary memory, based on reading the content of said memory segment; and resuming the execution of the guest instructions in the at least one target virtual machine.

20. The computer system of claim 16, wherein the method further comprises:

based on the reassignment being unsuccessful, resuming the at least one source virtual machine from the source temporary memory, and reassigning the memory segments to the source hypervisor.

* * * * *